US012637569B2

(12) United States Patent
Guichard et al.

(10) Patent No.: US 12,637,569 B2
(45) Date of Patent: May 26, 2026

(54) CROSSLINKABLE SILICONE ELASTOMER COMPOSITION CONTAINING A HEAT-RESISTANT ADDITIVE

(71) Applicant: ELKEM SILICONES FRANCE SAS, Lyons (FR)

(72) Inventors: Gérald Guichard, Givors (FR); Christian Maliverney, Saint Julien sur Bibost (FR); Arnaud Ponce, Saint Martin en Haut (FR)

(73) Assignee: ELKEM SILICONES FRANCE SAS, Saint-Fons (FR)

( * ) Notice: Subject to any disclaimer, the term of this patent is extended or adjusted under 35 U.S.C. 154(b) by 741 days.

(21) Appl. No.: 18/018,521

(22) PCT Filed: Jul. 29, 2021

(86) PCT No.: PCT/FR2021/051416
§ 371 (c)(1),
(2) Date: Jun. 14, 2023

(87) PCT Pub. No.: WO2022/023675
PCT Pub. Date: Feb. 3, 2022

(65) Prior Publication Data

US 2023/0295428 A1 Sep. 21, 2023

(30) Foreign Application Priority Data

Jul. 29, 2020 (FR) .................................... 20 08042

(51) Int. Cl.

| | |
|---|---|
| ***C08L 83/04*** | (2006.01) |
| ***C08K 3/36*** | (2006.01) |
| ***C08K 5/14*** | (2006.01) |
| ***H01B 3/46*** | (2006.01) |
| *C08K 3/22* | (2006.01) |

(52) U.S. Cl.
CPC ................ *C08L 83/04* (2013.01); *C08K 3/36* (2013.01); *C08K 5/14* (2013.01); *H01B 3/46* (2013.01); *C08K 2003/2213* (2013.01); *C08L 2203/206* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,663,282 | A * | 5/1972 | Smith | C09D 183/00 | 106/287.18 |
| 4,514,529 | A * | 4/1985 | Beers | F02F 7/006 | 524/731 |
| 4,847,396 | A * | 7/1989 | Beers | C08L 83/04 | 556/421 |
| 2002/0137849 | A1* | 9/2002 | Kerns | C08F 36/04 | 525/201 |
| 2010/0280163 | A1* | 11/2010 | Hasegawa | C08K 5/14 | 524/430 |
| 2023/0295428 | A1* | 9/2023 | Guichard | C08K 3/36 | 523/173 |

FOREIGN PATENT DOCUMENTS

| | | | |
|---|---|---|---|
| EP | 0093627 | A1 | 11/1983 |
| WO | 2007/115834 | A2 | 10/2007 |

OTHER PUBLICATIONS

International Search Report and Written Opinion dated Dec. 9, 2021, issued in corresponding International Patent Application No. PCT/FR2021/051416, 11 pages.

* cited by examiner

*Primary Examiner* — Peter A Salamon
(74) *Attorney, Agent, or Firm* — Baker Botts LLP

(57) ABSTRACT

A crosslinkable silicone elastomer composition is described that includes a heat-resistant additive. In particular, a crosslinkable silicone elastomer composition is described that includes a heat-resistant additive that is cerium (IV) neodecanoate.

17 Claims, No Drawings

CROSSLINKABLE SILICONE ELASTOMER COMPOSITION CONTAINING A HEAT-RESISTANT ADDITIVE

CROSS-REFERENCE TO PRIOR APPLICATIONS

This application is a National Stage of PCT/FR2021/051416, filed Jul. 29, 2021, and designating the United States (published on Feb. 3, 2022, as WO2022/023675A1), which claims priority under 35 U.S.C. § 119 to French Patent Application No. FR2008042, filed Jul. 29, 2020, hereby expressly incorporated by reference in its entirety and assigned to the assignee hereof.

TECHNICAL FIELD

The present invention relates to a crosslinkable silicone elastomer composition comprising a heat-resistant additive. In particular, the invention relates to a crosslinkable silicone elastomer composition comprising a heat-resistant additive that is cerium(IV) neodecanoate.

TECHNOLOGICAL BACKGROUND

It is well known that silicone elastomers display considerable inertia to heat and to cold in continuous service from −50° C. to 200° C. Almost all of their chemical, mechanical, and dielectric properties are maintained in this temperature range.

However, when silicone elastomers are used at a temperature above 200° C. for a long period, for example several days, their properties tend to degrade. It is therefore sometimes necessary to include suitable heat-resistant additives in their composition. This is all the more true when silicone elastomers are intended to be used in the production of the coverings or primary insulation included in the constitution of electric wires or cables protected against fire, which must withstand high temperatures. This is also true when silicone elastomers are intended to be used in the production of automobile cables.

It is known for example to use antioxidant compounds in order to stop this thermal degradation. These antioxidants are mainly of two kinds, either nonmetallic (based on sulfur, phosphorus, amine etc.), or inorganometallic or organometallic.

U.S. Pat. No. 8,084,529 describes silicone compositions containing from 0.001 to 10 wt % of cerium oxide powder. Addition of cerium oxide makes it possible to improve the thermal stability of the elastomer obtained after crosslinking.

British patent GB-A-1 251 305 proposes incorporating at least 3 wt % of fumed titanium dioxide to the elastomer base composition and reports an improvement in behavior (compression and resistance to reversion) of the elastomer cured at temperatures of 232 and 315° C. held for 16 and 24 hours respectively.

However, the antioxidants used do not always make it possible to obtain transparent silicone elastomers that can be colored easily. Moreover, it is sometimes necessary to formulate the antioxidants in a solvent so as to be able to add them to the crosslinked silicone elastomer composition, which makes formulation of the silicone composition complicated. The presence of antioxidants in the silicone composition may also slow down the crosslinking kinetics.

In this context, the present invention is intended to satisfy at least one of the following aims.

One of the essential aims of the invention is to supply a crosslinkable silicone elastomer composition that makes it possible to obtain a thermally stable silicone elastomer.

One of the essential aims of the invention is to supply a crosslinkable silicone elastomer composition that makes it possible to obtain a silicone elastomer having good mechanical properties and heat resistance, for example that is able to resist more than 250° C. for several days.

One of the essential aims of the invention is to supply a crosslinkable silicone elastomer composition that makes it possible to obtain a silicone elastomer that retains its elastomeric properties, even on repeated and/or prolonged exposure to heat.

One of the essential aims of the invention is to supply a crosslinkable silicone elastomer composition that makes it possible to obtain a silicone elastomer that maintains good properties of elongation after thermal treatment, for example that maintains elongation at break greater than 150%, or 200%, after thermal treatment.

One of the essential aims of the invention is to supply a heat-resistant additive that does not have any problems of solubility in silicone compositions, and that can be dispersed directly in silicone compositions, without using solvent.

Another essential aim of the invention is to supply a crosslinkable silicone elastomer composition that makes it possible to obtain a silicone elastomer that is transparent, and consequently can be colored easily by adding pigment.

Another essential aim of the invention is to supply a crosslinkable silicone elastomer composition that makes it possible to obtain a silicone elastomer that is transparent, even when the silicone composition comprises a large amount of filler, for example more than 15 wt %.

Another essential aim of the invention is to supply a crosslinkable silicone elastomer composition that makes it possible to obtain a silicone elastomer having good mechanical properties and heat resistance, whose crosslinking kinetics is not slowed down.

Another essential aim of the invention is to supply a crosslinkable silicone elastomer composition that is usable for making coverings or primary insulation included in the constitution of electric wires or cables.

Another essential aim of the invention is to supply a crosslinkable silicone elastomer composition that is usable for making automobile cables.

One of the essential aims of the invention is to supply a crosslinkable silicone elastomer composition that is easy to formulate.

BRIEF DESCRIPTION OF THE INVENTION

These aims, among others, are achieved by the present invention, which relates firstly to a crosslinkable silicone elastomer composition X comprising:

- at least one heat-resistant additive D, which is cerium(IV) neodecanoate.

By using a heat-resistant additive D that is cerium(IV) neodecanoate, it is possible to improve the thermal stability of the silicone elastomer, while maintaining transparency of the silicone elastomer, even when the silicone composition X comprises more than 15 wt % of filler E, or when the cerium content is high.

In fact, quite remarkably, the elastomer obtained is thermally stable. It has acceptable elastomeric properties and does not become brittle after treatment for 3 days at 300° C., 7 days at 275° C. or 21 days at 250° C. Hardness, resilience, breaking strength, elongation at break and modulus at 100% remained within entirely acceptable limits, i.e. within limits allowing the intended use of the elastomer.

Moreover, the elastomer obtained is thermally stable even after long-term thermal treatment, for example 3000 hours at 200° C. This long-term thermal treatment corresponds to the tests carried out on automobile cables (cf. standard ISO 6722). It is therefore possible to use the crosslinkable silicone elastomer composition X for making automobile cables and, in particular, automobile cables for electric or hybrid vehicles.

Moreover, cerium(IV) neodecanoate is liquid at room temperature, therefore it is easy to use and to mix. It is possible to add it to the silicone composition as it is, without solvent. The silicone composition is therefore easy to formulate.

Moreover, the silicone composition X makes it possible to obtain a silicone elastomer having good mechanical properties, and the use of cerium(IV) neodecanoate does not affect the crosslinking kinetics.

The invention also relates to a silicone elastomer obtained by crosslinking of composition X, preferably by heating to a temperature between 80° C. and 250° C.

The invention also relates to an electric wire or electric cable comprising at least one conductive element 1 surrounded by at least one layer of primary insulation 2, characterized in that said layer of primary insulation 2 comprises a silicone elastomer obtained by crosslinking of composition X.

The invention also relates to the use of a silicone composition X for making the coverings or primary insulation of the single conductors included in the constitution of electric wires or cables.

The invention also relates to the use of a silicone composition X for making automobile cables, in particular automobile cables for electric or hybrid vehicles.

The invention also relates to a method for making an electric wire or electric cable comprising the following steps:

i. forming, around an electrical conductor 1, at least one layer of primary insulation 2 that consists of a material obtained by crosslinking the silicone composition X, preferably by heating to a temperature between 80° C. and 250° C., ii. optionally, assembling at least two insulated electrical conductors as obtained in step i, and iii. optionally, extruding an outer sheath as defined above around the insulated electrical conductor or conductors from step i or ii.

Definitions

"Thermally stable silicone elastomer" means, in the sense of the invention, in particular a silicone elastomer that maintains elastomeric properties and does not become hard or brittle when it is subjected to a temperature above 200° C., in particular between 250° C. and 300° C., maintained for several days, in particular 3 days. Quite preferably, it is thus an elastomer resistant to a temperature above 250° C., in particular between 275° C. and 300° C., maintained for 3 days or more.

"Electric wire" means an electrical engineering component serving for conveying electricity, in order to transmit energy or information and that consists of a material that conducts electricity, single-stranded or multistranded, surrounded by an insulating sheath. The interior of an electric wire is called "conductor" of the wire.

"Core" or "single-core" means an element made up of a conductor and its insulating sheath.

"Electric cable" means an electrical engineering component serving for conveying electricity, in order to transmit energy or information and that consists of several conductors electrically distinct and mechanically solid cores optionally with external screening.

An electric cable consists of one or more single conductor(s) (generally based on copper or aluminum); each of these single conductors is protected by a covering or primary insulation made of one or more concentric layer(s) based on an insulator. Around this covering or these coverings (in the case of a cable with several single conductors), one or more filling element(s) is (are) provided, and/or one or more reinforcing element(s) based in particular on glass fibers and/or mineral fibers. Then an outer sheath, which may comprise one or more sheath(s), is generally present. In the case of an electric cable with several single conductors, the filling element(s) and/or reinforcing element(s), which is (are) arranged around the single conductors (each equipped with its primary insulation), constitute(s) a common covering for all the single conductors.

In the present application, all parts, percentages and ppm are expressed by weight, unless stated otherwise.

DETAILED DESCRIPTION

The crosslinkable silicone elastomer composition X according to the invention comprises:

At least one heat-resistant additive D, which is cerium(IV) neodecanoate.

Heat-Resistant Additive D

The heat-resistant additive D is cerium(IV) neodecanoate. The cerium is in degree of oxidation IV. Cerium(IV) neodecanoate has the following formula: $CeC_{40}H_{76}C_8$.

One of the possible structural formulas of cerium(IV) neodecanoate is as follows:

[Chem. 1]

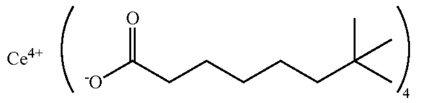

The neodecanoate is a mixture of constitutional isomers of formula $(C_{10}H_{19}O_2)^-$. Preferably, the neodecanoate is a mixture of constitutional isomers, including trialkyl acetates (i.e. the carbon in alpha position of the carbonyl is a quaternary carbon). Among the isomers of the neodecanoate, we may mention 2,2,3,5-tetramethylhexanoate, 2,4-dimethyl-2-isopropylpentanoate, 2,5-dimethyl-2-ethylhexanoate and 2,2-dimethyloctanoate.

Cerium(IV) neodecanoate is liquid at room temperature and is dispersible in silicones. It may therefore be used pure or formulated. When it is used pure, it is added as it is in the silicone composition X. When it is formulated, it may be added to a silicone oil or to a silicone rubber before being added to the silicone composition X.

Cerium(IV) neodecanoate disperses well in silicones; it is directly compatible with silicones. Therefore it is not necessary to use a solvent for incorporating it in the silicone composition.

According to one embodiment, the silicone composition X has a content of cerium(IV) between 50 and 3000 ppmw, preferably between 50 and 1000 ppm, and preferably between 50 and 500 ppm.

Preferably, the silicone composition X has a content of cerium(IV) between 50 and 350 ppm, preferably between 60 and 300 ppm, preferably between 70 and 250 ppm, and even more preferably between 90 and 200 ppm.

A cerium content between 50 and 350 ppm makes it possible in particular to obtain an elastomer that maintains elongation at break greater than 200%, after thermal treatment of 7 days at 275° C.

Cerium(IV) neodecanoate makes it possible to obtain a thermally stable elastomer, which retains its elastomeric properties, and does not become hard or brittle when it is subjected to a temperature above 200° C., in particular between 250° C. and 300° C., maintained for several days, in particular 3 days. In particular, cerium(IV) neodecanoate makes it possible to obtain an elastomer that is thermally stable after thermal treatment of 3 days at 300° C., 7 days at 275° C., 21 days at 250° C., or 3000 hours at 200° C.

Moreover, the elastomer obtained is transparent, even when the silicone composition X comprises a large amount of filler and/or a high cerium content. It is therefore possible to color it easily by adding pigments to the silicone composition X. Moreover, it is also possible to have bright colors, as there is no alteration of the colors or of the transparency.

Advantageously, cerium(IV) neodecanoate has a level of free acid below 5%, preferably below 2.5%, and preferably below 1.5%. The level of free acid corresponds to the level of free, non-complexed neodecanoic acid.

Crosslinkable Silicone Elastomer Composition X

The crosslinkable silicone elastomer composition X may be presented in a single package or several packages (single-component or multi-component). It comprises, besides the heat-resistant additive D, a main constituent formed from one or more polyorganosiloxane constituent(s), a suitable catalyst and optionally one or more compounds, preferably selected from fillers, crosslinking inhibitors, and pigments.

The silicone composition X may be crosslinked either at high temperature under the action of organic peroxides (EVC or HCR), or in the presence of a metallic catalyst at room temperature, optionally in the presence of moisture (polyaddition or polycondensation RTV) or with heat (EVC or polyaddition LSR).

The expressions RTV, LSR, EVC or HCR are familiar to a person skilled in the art: RTV is the abbreviation of "Room Temperature Vulcanizing"; LSR is the abbreviation of "Liquid Silicone Rubber"; HCR is the abbreviation of "Heat Cured Rubber" and EVC is the abbreviation of "Elastomère Vulcanisable à Chaud" (Heat Vulcanizable Elastomer).

To prepare the silicone composition X according to the invention, the various ingredients may be intimately mixed by means of the devices that are well known in the silicone elastomer industry; they may be incorporated in any order.

According to a first embodiment, the crosslinkable silicone elastomer composition X is a composition that crosslinks:

- under the action of organic peroxides or
- by reactions of polyaddition, in the presence of a polyaddition catalyst, at room temperature or in the presence of heating.

In this case, the crosslinkable silicone elastomer composition X comprises, additionally:

- At least one polyorganosiloxane A comprising, per molecule, at least 2 alkenyl groups having from 2 to 6 carbon atoms;
- Optionally, at least one polyorganosiloxane B comprising, per molecule, at least 2 hydrogenosilyl functions Si—H;
- At least one crosslinking catalyst C; and
- At least one filler E.

According to one embodiment, the crosslinkable silicone elastomer composition X comprises:

- At least one polyorganosiloxane A comprising, per molecule, at least 2 alkenyl groups having from 2 to 6 carbon atoms;
- Optionally, at least one polyorganosiloxane B comprising, per molecule, at least 2 hydrogenosilyl functions Si—H;
- At least one crosslinking catalyst C;
- At least one heat-resistant additive D, which is cerium(IV) neodecanoate; and
- At least one filler E, said silicone composition X having a content of cerium(IV) between 50 and 3000 ppmw.

Polyorganosiloxane A

Advantageously, polyorganosiloxane A is selected from the polyorganosiloxane compounds comprising units of formula (I):

$$Z_aU_bSiO_{(4-(a+b))/2} \quad (I)$$

in which:

- the radicals Z, which may be identical or different, represent a linear or branched alkenyl radical, having from 2 to 6 carbon atoms;
- the radicals U, which may be identical or different, represent a monovalent radical having from 1 to 12 carbon atoms,
- a=1, 2 or 3, b=0, 1 or 2 and a+b=1, 2 or 3;

and optionally comprising other units of formula (II):

$$U_cSiO_{(4-c)/2} \quad (II)$$

in which U has the same meaning as above, and c=0, 1, 2, or 3.

Preferably, the radicals Z represent a vinyl radical.

It is understood in formula (I) and in formula (II) above that if several groups U are present, they may be identical to or different than one another. In formula (I), the symbol "a" may preferably be equal to 1. According to one embodiment, in formula (I), a=1 or 2, b=1 or 2, and a+b=2 or 3. According to one embodiment, in formula (II), c=2 or 3.

In formula (I) and in formula (II), U may represent a monovalent radical selected from the group consisting of the alkyl groups having 1 to 8 carbon atoms, optionally substituted with at least one halogen atom such as chlorine or fluorine, the cycloalkyl groups having from 3 to 8 carbon atoms and the aryl groups having from 6 to 12 carbon atoms. U may advantageously be selected from the group consisting of methyl, ethyl, propyl, 3,3,3-trifluoropropyl, xylyl, tolyl and phenyl.

Said polyorganosiloxanes A may be oils with dynamic viscosity of the order of 10 to 1000000 mPa·s at 25° C., generally of the order of 10 to 70000 mPa·s at 25° C., or rubbers with dynamic viscosity above 1000000 mPa·s at 25° C. Silicone oils and rubbers are polymers of linear structure.

All the viscosities that are relevant in the present text correspond to a dynamic viscosity at 25° C. called "newtonian", i.e. the dynamic viscosity that is measured, in a manner known per se, with a Brookfield viscosimeter at a gradient of shear rate low enough for the viscosity measured to be independent of the shear rate gradient.

These polyorganosiloxanes A may have a linear, branched or cyclic structure. Their degree of polymerization is preferably between 2 and 5000.

Preferably, polyorganosiloxane A has a linear structure. In the case of linear polymers, these essentially consist of siloxy units "D" selected from the group consisting of the siloxy units $Z_2SiO_{2/2}$, $ZUSiO_{2/2}$ and $U_2SiO_{2/2}$, and of siloxy units "M" selected from the group consisting of the siloxy units $ZU_2SiO_{1/2}$, $Z_2USiO_{1/2}$ and $Z_3SiO_{1/2}$. The symbols Z and U are as described above.

As examples of terminal units "M", we may mention the trimethylsiloxy, dimethylphenylsiloxy, dimethylvinylsiloxy or dimethylhexenylsiloxy groups.

As examples of units "D", we may mention the dimethylsiloxy, methylphenylsiloxy, methylvinylsiloxy, methylbutenylsiloxy, methylhexenylsiloxy, methyldecenylsiloxy, diphenylsiloxy, or methyldecadienylsiloxy groups.

Examples of linear polyorganosiloxanes that may be unsaturated compounds A according to the invention are:

- a poly(dimethylsiloxane) with dimethylvinylsilyl ends;
- a poly(dimethylsiloxane-co-methylphenylsiloxane) with dimethylvinylsilyl ends;
- a poly(dimethylsiloxane-co-diphenylsiloxane) with dimethylvinylsilyl ends;
- a poly(dimethylsiloxane-co-methylvinylsiloxane) with dimethylvinylsilyl ends;
- a poly(dimethylsiloxane-co-methylvinylsiloxane) with trimethylsilyl ends; and
- a cyclic poly(methylvinylsiloxane).

The cyclic polyorganosiloxanes that may also be unsaturated compounds A according to the invention are for example those consisting of siloxy units "D" of the following formulas: $Z_2SiO_{2/2}$, $U_2SiO_{2/2}$ or $ZUSiO_{2/2}$, which may be of the dialkylsiloxy, alkarylsiloxy, alkylvinylsiloxy, alkylsiloxy type. Said cyclic polyorganosiloxanes have a viscosity of the order of 10 to 5000 mPa·s at 25° C.

Preferably, the polyorganosiloxane compound A has a content by weight of Si-vinyl unit between 0.001 and 30%, preferably between 0.01 and 10%.

As other examples of unsaturated compounds A, we may mention the silicone resins comprising at least one vinyl radical. For example they may be selected from the group consisting of the following silicone resins:

- $MD^{Vi}Q$ where the vinyl groups are included in the units D,
- $MD^{Vi}TQ$ where the vinyl groups are included in the units D,
- $MM^{Vi}Q$ where the vinyl groups are included in a part of the units M,
- $MM^{Vi}TQ$ where the vinyl groups are included in a part of the units M,
- $MM^{Vi}DD^{Vi}Q$ where the vinyl groups are included in a part of the units M and D,
- and mixtures thereof, with:

- $M^{Vi}$=siloxy unit of formula $(R)_2(vinyl)SiO_{1/2}$
- $D^{Vi}$=siloxy unit of formula (R) (vinyl) $SiO_{2/2}$
- T=siloxy unit of formula $(R)SiO_{3/2}$
- Q=siloxy unit of formula $SiO_{4/2}$
- M=siloxy unit of formula $(R)_3SiO_{1/2}$
- D=siloxy unit of formula $(R)_2SiO_{2/2}$ and the groups R, which may be identical or different, are monovalent hydrocarbon groups selected from the alkyl groups having from 1 to 8 carbon atoms inclusive such as the methyl, ethyl, propyl and 3,3,3-trifluoropropyl groups and the aryl groups such as xylyl, tolyl and phenyl. Preferably, the groups R are methyls.

Of course, according to variants, the polyorganosiloxane A may be a mixture of several oils or resins corresponding to the definition of the polyorganosiloxane A. Advantageously, the polyorganosiloxane A does not comprise resin.

According to one embodiment, the crosslinkable silicone elastomer composition X comprises between 55 and 85 wt % of polyorganosiloxane A, preferably between 60 and 80%, relative to the total weight of the silicone composition X.

In the case of the silicone compositions X crosslinking by reactions of polyaddition at room temperature (polyaddition RTV), the polyorganosiloxane A bearing alkenyl groups advantageously has a viscosity at 25° C. equal at most to 50000 mPa·s, and preferably between 200 and 10000 mPa·s. In the case of the silicone compositions X crosslinking by reactions of hot polyaddition (polyaddition LSR), the polyorganosiloxane A bearing alkenyl groups advantageously has a viscosity at 25° C. above 1000 mPa·s, preferably in the range from a value above 5000 mPa·s to 300000 mPa·S. In the case of the compositions X crosslinking by reactions of hot polyaddition (polyaddition EVC), the polyorganosiloxane A bearing alkenyl groups advantageously has a viscosity at 25° C. above 300000 mPa·s, and preferably between 1 million mPa·s and 30 million mPa·s or even more.

Polyorganosiloxane B

In certain cases, the crosslinkable silicone elastomer composition X comprises at least one polyorganosiloxane B comprising, per molecule, at least 2 hydrogenosilyl functions Si—H. According to one embodiment, the crosslinkable silicone elastomer composition X comprises a polyorganosiloxane B comprising, per molecule, at least 2 hydrogenosilyl functions Si—H, and a crosslinking catalyst C that is selected from the polyaddition catalysts.

The compound B is an organohydrogenopolysiloxane compound comprising per molecule at least two, and preferably at least three hydrogenosilyl functions (Si—H).

The organohydrogenopolysiloxane B may advantageously be a polyorganosiloxane comprising at least one unit of formula (III):

$$H_dU_eSiO_{(4-(d+e))/2} \quad \text{(III)}$$

in which:

the radicals U, which may be identical or different, represent a hydrocarbon radical having from 1 to 12 carbon atoms, d=1 or 2, e=0, 1 or 2 and d+e=1, 2 or 3;

and optionally other units of formula (IV):

$$U_fSiO_{(4-f)/2} \quad \text{(IV)}$$

in which U has the same meaning as above, and f=0, 1, 2, or 3.

It is understood in formula (III) and in formula (IV) above that if several groups U are present, they may be identical to or different than one another. In formula (III), the symbol d may preferably be equal to 1. Moreover, in formula (III) and in formula (IV), U may represent a monovalent radical selected from the group consisting of the alkyl groups having 1 to 8 carbon atoms, optionally substituted with at least one halogen atom such as chlorine or fluorine, the cycloalkyl groups having from 3 to 8 carbon atoms and the aryl groups having from 6 to 12 carbon atoms. U may advantageously be selected from the group consisting of methyl, ethyl, propyl, 3,3,3-trifluoropropyl, xylyl, tolyl and phenyl.

These polyorganosiloxanes B may have a linear, branched, or cyclic structure. The degree of polymerization is preferably greater than or equal to 2. Generally, it is below 5000.

In the case of linear polymers, these consist essentially of:

- siloxy units "D" selected from the units of the following formulas $U_2SiO_{2/2}$ or $UHSiO_{2/2}$, and siloxy units "M" selected from the units of the following formulas $U_3SiO_{1/2}$ or $U_2HSiO_{1/2}$.

The linear polyorganosiloxanes may be oils with dynamic viscosity of the order of 1 to 100000 mPa·s at 25° C. and more generally of the order of 10 to 5000 mPa·s at 25° C.

Examples of polyorganosiloxanes that may be compounds B according to the invention comprising at least one hydrogen atom bound to a silicon atom are:

- a poly(dimethylsiloxane) with hydrogenodimethylsilyl ends;
- a poly(dimethylsiloxane-co-methylhydrogenosiloxane) with trimethylsilyl ends;
- a poly(dimethylsiloxane-co-methylhydrogenosiloxane) with hydrogenodimethylsilyl ends;
- a poly (methylhydrogenosiloxane) with trimethylsilyl ends; and
- a cyclic poly(methylhydrogenosiloxane), In the case of cyclic polyorganosiloxanes, these consist of siloxy units "D" of the following formulas $U_2SiO_{2/2}$ and $UHSiO_{2/2}$, which may be of the dialkylsiloxy or alkarylsiloxy type or units $UHSiO_{2/2}$ only. They then have a viscosity of the order of 1 to 5000 mPa·s.

The following compounds are particularly suitable for the invention as organohydrogenopolysiloxane compounds B:

[Chem 2]

S1

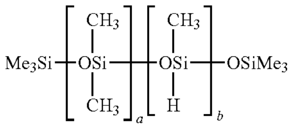

S2

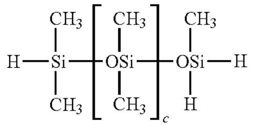

S3

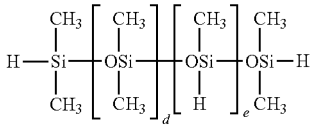

with a, b, c, d and e defined below:

in the polymer of formula S1:

$0 \leq a \leq 150$, preferably $0 \leq a \leq 100$, and more particularly $0 \leq a \leq 20$, and $1 \leq b \leq 90$, preferably $10 \leq b \leq 80$ and more particularly $30 \leq b \leq 70$, in the polymer of formula S2: $0 \leq c \leq 15$ in the polymer of formula S3: $5 \leq d \leq 200$, preferably $20 \leq d \leq 100$, and $2 \leq e \leq 90$, preferably $10 \leq e \leq 70$.

Preferably, the organohydrogenopolysiloxane compound B has a content by weight of hydrogenosilyl functions Si—H between 0.2 and 91%. The organohydrogenopolysiloxane compound B may have a content by weight of hydrogenosilyl functions Si—H greater than or equal to 5%, preferably greater than or equal to 10%. For example, the content by weight of hydrogenosilyl functions Si—H is between 5 and 40%, or between 10 and 30%.

According to one embodiment, the organohydrogenopolysiloxane B is a resin having a branched structure. The organohydrogenopolysiloxane B may be selected from the group consisting of the following silicone resins:

- M'Q where the hydrogen atoms bound to silicon atoms are carried by the groups M,
- MM'Q where the hydrogen atoms bound to silicon atoms are carried by a part of the units M,
- MD'Q where the hydrogen atoms bound to silicon atoms are carried by the groups D,
- MDD'Q where the hydrogen atoms bound to silicon atoms are carried by a part of the groups D,
- MM'TQ where the hydrogen atoms are included in a part of the units M,
- MM'DD'Q where the hydrogen atoms are included in a part of the units M and D,
- and mixtures thereof, with:

M, D, T and Q as defined above

M'=siloxy unit of formula $R_2HSiO_{1/2}$

D'=siloxy unit of formula $RHSiO_{2/2}$, and the groups R, which may be identical or different, are monovalent hydrocarbon groups selected from the alkyl groups having from 1 to 8 carbon atoms inclusive such as methyl, ethyl, propyl and 3,3,3-trifluoropropyl groups. Preferably, the groups R are methyls.

Preferably, the organohydrogenopolysiloxane resin B is a resin M'Q or MD'Q as described above. Even more preferably, the organohydrogenopolysiloxane resin B is a resin M'Q.

Of course, according to variants, the organohydrogenopolysiloxane B may be a mixture of several oils or resins corresponding to the definition of the organohydrogenopolysiloxane B. Advantageously, the organohydrogenopolysiloxane B is not a resin.

The crosslinkable silicone elastomer composition X may comprise between 0 and 10 wt % of organohydrogenopolysiloxane B, preferably between 0.5 and 10%, relative to the total weight of the silicone composition X.

Advantageously, the molar ratio of the hydrogenosilyl functions Si—H of the compounds B to the alkene functions of the compounds A is between 0.02 and 5, preferably between 0.1 and 4, and more preferably between 0.5 and 3.

Crosslinking Catalyst C

The crosslinkable silicone elastomer composition X comprises a crosslinking catalyst C.

The crosslinkable silicone elastomer composition X may comprise between 0.1 and 2 wt % of crosslinking catalyst C, relative to the total weight of the silicone composition X.

According to a first embodiment, the crosslinking catalyst C is an organic peroxide.

The organic peroxide may be any one of those that act as vulcanizing agents on the compositions that form silicone elastomers. It may thus be any one of the peroxides or per esters whose use with silicone elastomers is known, for example ditert-butyl peroxide, benzoyl peroxide, tert-butyl peracetate, dicumyl peroxide, 2,5-dimethylhexane 2,5-diperbenzoate and bis(t-butylperoxy)-2,5 dimethyl-2,5 hexane, monochlorobenzoyl peroxide, 2,4-dichlorobenzoyl peroxide, bis(2,4-dichlorobenzoyl) peroxide, tert-butyl peracetate, 2,5-dimethyl-2,5-di(tert-butylperoxy) hexane, 2,2-bis(t-butylperoxy)-p-diisopropylbenzene, t-butyl perbenzoate, the carbonate of peroxy t-butyl and isopropyl, and bis(t-butylperoxy)-1,1 trimethyl-3,3,5 cyclohexane.

According to one embodiment, the organic peroxide is selected from benzoyl peroxide, 2,4-dichlorobenzoyl peroxide, tert-butyl peracetate, dicumyl peroxide, and mixtures thereof.

Preferably, the organic peroxide is selected from the group consisting of 2,5-dimethyl-2,5-di(tert-butylperoxy) hexane, dicumyl peroxide, bis(2,4-dichlorobenzoyl) peroxide, and mixtures thereof.

In general, when the organic peroxide is present in the silicone composition X, the amount of organic peroxide is between 0.05 and 10 parts by weight, preferably between 0.5 and 2 parts by weight, per 100 parts by weight of the silicone composition X.

In the manufacture of electric cables or wires by extrusion, the choice of peroxide will depend in practice on the method used for curing the elastomer (method of vulcanization). When the method of vulcanization functions in the absence of pressure (for example, hot air and/or (infrared) radiation furnace), the peroxide used is then preferably monochlorobenzoyl peroxide and/or 2,4-dichlorobenzoyl peroxide. When the method of vulcanization functions in the presence of pressure (for example, steam tube), the peroxide used is then preferably bis(t-butylperoxy)-2,5 dimethyl-2,5 hexane.

According to a second embodiment, the catalyst C is a hydrosilylation reaction catalyst. In this case, the crosslinkable silicone elastomer composition X comprises at least one polyorganosiloxane B comprising, per molecule, at least 2 hydrogenosilyl functions Si—H, and preferably at least 3 hydrogenosilyl functions Si—H.

The hydrosilylation reaction catalysts are well known. Compounds of platinum and of rhodium are preferably used. We may, in particular, use the complexes of platinum and of an organic product described in U.S. Pat. Nos. 3,159,601, 3,159,602, 3,220,972 and the European patents EP-A-0,057,459, EP A 0,188,978 and EP-A-0,190,530, the complexes of platinum and of vinylated organosiloxanes described in U.S. Pat. Nos. 3,419,593, 3,715,334, 3,377,432 and 3,814,730. The catalyst generally preferred is platinum. In this case, the amount by weight of catalyst C, calculated as the weight of platinum metal, is generally between 2 and 400 ppm, preferably between 5 and 200 ppm based on the total weight of the polyorganosiloxane A. In this case, the catalyst C may be a platinum catalyst, for example a Karstedt catalyst.

Filler E

The crosslinkable silicone composition X comprises a filler E. The filler E makes it possible to improve the mechanical properties of the silicone elastomer article obtained at the end of crosslinking, while maintaining good elastomer properties. In particular, the filler E makes it possible to improve the rupture modulus of the silicone elastomer article obtained, while maintaining high elongation at break.

According to one embodiment, the silicone composition X comprises between 15 and 35 wt % of filler E. Advantageously, the silicone composition X comprises between 20 and 30 wt % of filler E.

The filler E optionally provided is preferably mineral. The filler E may be a very finely divided product, whose average particle diameter is less than 0.1 μm. The filler E may in particular be siliceous. In the case of siliceous materials, they may perform the role of reinforcing or semi-reinforcing filler. The reinforcing siliceous fillers are selected from colloidal silicas, powders of fumed and precipitated silica or mixtures thereof. These powders have an average particle size generally under 0.1 μm (micrometers) and a BET specific surface area greater than 30 $m^2/g$, preferably between 30 and 350 $m^2/g$. The semi-reinforcing siliceous fillers such as diatomaceous earths or ground quartz may also be used. These silicas may be incorporated as they are or after being treated with organosilicon compounds usually employed for this purpose. Among these compounds there are the methylpolysiloxanes such as hexamethyldisiloxane, octamethylcyclotetrasiloxane, methylpolysilazanes such as hexamethyldisilazane, hexamethylcyclotrisilazane, tetramethyldivinyldisilazane, chlorosilanes such as dimethyldichlorosilane, trimethylchlorosilane, methylvinyldichlorosilane, dimethylvinylchlorosilane, alkoxysilanes such as dimethyldimethoxysilane, dimethylvinylethoxysilane, trimethylmethoxysilane, and mixtures thereof. Regarding the non-siliceous mineral materials, they may be used as semi-reinforcing or filling mineral filler. Examples of these non-siliceous fillers usable alone or in a mixture are calcium carbonate, optionally surface-treated with an organic acid or with an ester of an organic acid, calcined clay, titanium dioxide of the rutile type, oxides of iron, zinc, chromium, zirconium, or magnesium, the various forms of alumina (hydrated or not), boron nitride, lithopone, barium metaborate, barium sulfate and glass microbeads. These fillers are coarser, generally with an average particle diameter greater than 0.1 μm and a specific surface area generally less than 30 $m^2/g$. These fillers may have been surface-modified by treatment with the various organosilicon compounds usually employed for this purpose.

Preferably, the filler E is silica, and even more preferably fumed silica. Advantageously, the silica has a BET specific surface area between 75 and 410 $m^2/g$.

According to one embodiment, the crosslinkable silicone elastomer composition X comprises:

- between 55 and 85 wt %, preferably between 60 and 80 wt %, of at least one polyorganosiloxane A comprising, per molecule, at least 2 alkenyl groups having from 2 to 6 carbon atoms;
- between 0 and 10 wt %, preferably between 0.5 and 10%, of at least one polyorganosiloxane B comprising, per molecule, at least 2 hydrogenosilyl functions Si—H;
- between 0.1 and 2 wt % of at least one crosslinking catalyst C;
- at least one heat-resistant additive D, which is cerium(IV) neodecanoate; and
- between 15 and 35 wt % of at least one filler E, said silicone composition X having a content of cerium(IV) between 50 and 3000 ppmw.

Other Additives

The crosslinkable silicone elastomer composition X may also comprise a crosslinking inhibitor F. The latter is generally used in order to give the ready-to-use composition a certain pot life. These crosslinking inhibitors are present in particular when the precursor silicone composition X of silicone coating(s) is a polyorganosiloxane crosslinkable by polyaddition or dehydrogenation and when the catalyst C used is platinum-based. The crosslinking inhibitor F is preferably selected from acetylene alcohols (ethynylcyclohexanol: ECH), diallyl maleates, triallyl isocyanurates, dialkyl maleates (diethyl maleates or dialkylalkinyl dicarboxylates) (diethylacetylene dicarboxylate) or else from the polyorganosiloxanes, advantageously cyclic and substituted with at least one alkenyl, tetramethylvinylcyclotetrasiloxane being particularly preferred, or the alkylated maleates. The acetylene alcohols are useful retarders according to the invention. We may mention as examples:

- ethynyl-1-cyclohexanol-1;
- methyl-3 dodecyn-1-ol-3;
- trimethyl-3,7,11 dodecyn-1-ol-3;

diphenyl-1,1 propyn-2-ol-1;

ethyl-3 ethyl-6 nonyn-1-ol-3; and methyl-3 pentadecyn-1-ol-3.

The crosslinkable silicone elastomer composition X may also comprise a pigment G. The pigment G may be an organic pigment or an inorganic pigment (mineral pigment).

The crosslinkable silicone elastomer composition X may also comprise a plasticizer H. The plasticizers H are generally of an organosilicic nature and are added to the silicone composition at a rate from 0 to 20 parts per 100 parts of polyorganosiloxane A. They make it possible to prevent curing of the compositions during storage. Among the plasticizers we may mention silanes with hydrolyzable groups, or hydroxylated or alkoxylated diorganopolysiloxane oils of low molecular weight. Such compositions are described for example in French patent 1 111 969.

According to a particular embodiment, the crosslinkable silicone elastomer composition X consists of:

At least one polyorganosiloxane A comprising, per molecule, at least 2 alkenyl groups having from 2 to 6 carbon atoms;

Optionally, at least one polyorganosiloxane B comprising, per molecule, at least 2 hydrogenosilyl functions Si—H;

At least one crosslinking catalyst C;

At least one heat-resistant additive D, which is cerium(IV) neodecanoate;

At least one filler E;

Optionally at least one crosslinking inhibitor F,

Optionally, at least one pigment G; and

Optionally at least one plasticizer H.

According to a particular embodiment, the crosslinkable silicone elastomer composition X does not comprise an adhesion promoter.

According to a particular embodiment, the crosslinkable silicone elastomer composition X does not comprise silicone resin, in particular does not comprise silicone resin comprising at least one alkenyl radical.

According to a second embodiment, the crosslinkable silicone elastomer composition X is crosslinkable in the presence of a metallic catalyst at room temperature, in the presence of moisture (polycondensation RTV).

In this second embodiment, the crosslinkable silicone elastomer composition X further comprises:

At least one polyorganosiloxane A' crosslinkable by polycondensation;

At least one crosslinking organosilicon compound B';

At least one catalyst C';

At least one filler E; and

Optionally a pigment G.

The polyorganosiloxane A' may be linear or branched, it bears hydroxyl groups or hydrolyzable groups selected from the group consisting of alkoxy, alkoxy-alkylene-oxy, amino, amido, acylamino, aminoxy, iminoxy, ketiminoxy, acyloxy and enoxy, and preferably alkoxy, which crosslink at room temperature by polycondensation reactions, under the action of moisture.

As examples of hydrolyzable, condensable groups Z of the alkoxy type, we may mention the groups having from 1 to 8 carbon atoms such as the methoxy, ethoxy, n-propoxy, isopropoxy, n-butoxy, iso-butoxy, sec-butoxy, tert-butoxy, 2-methoxyethoxy, hexyloxy or octyloxy groups.

As an example of hydrolyzable, condensable groups Z of the alkoxy-alkylene-oxy type, we may mention the methoxy-ethylene-oxy group.

As examples of hydrolyzable, condensable groups Z of the amino type, we may mention the methylamino, dimethylamino, ethylamino, diethylamino, n-butylamino, sec-butylamino or cyclohexylamino groups.

As an example of hydrolyzable, condensable groups Z of the amido type, we may mention the N-methyl-acetamido group.

As an example of hydrolyzable, condensable groups Z of the acylamino type, we may mention the benzoyl-amino group.

As examples of hydrolyzable, condensable groups Z of the aminoxy type, we may mention the dimethylaminoxy, diethylaminoxy, dioctylaminoxy or diphenylaminoxy groups.

As examples of hydrolyzable, condensable groups Z of the iminoxy and in particular ketiminoxy type, we may mention the groups derived from the following oximes: acetophenone-oxime, acetone-oxime, benzophenone-oxime, methyl-ethyl-ketoxime, diisopropyl-ketoxime or methyl-isobutyl-ketoxime.

As an example of hydrolyzable, condensable groups Z of the acyloxy type, we may mention the acetoxy group.

As an example of hydrolyzable, condensable groups Z of the enoxy type, we may mention the 2-propenoxy group.

The polyorganosiloxane A' may be a linear polydiorganosiloxane having at least two hydroxyl or alkoxy groups per molecule and whose dynamic viscosity at 25° C. is between 50 mPa·s and $50\times10^6$ mPa·s, preferably between 50 mPa·s and $10^6$ mPa·s in the case of silicone oils, or above $10^6$ mPa·s in the case of silicone rubbers.

The identical or different organic groups generally present in the structure of the polyorganosiloxane A' are the methyl, ethyl, phenyl or trifluoropropyl radicals. Preferably, at least 80% by number of said organic groups are methyl groups bound directly to the silicon atoms. In the context of the present invention, the α,ω-bis(dimethylhydroxysilyl) polydimethylsiloxanes and the α,ω-bis(dimethylalkoxysilyl) polydimethylsiloxanes are more especially preferred.

According to one embodiment, the crosslinkable silicone elastomer composition X comprises between 40 and 90 wt % of polyorganosiloxane A', preferably between 50 and 80%, relative to the total weight of the silicone composition X.

The catalyst C' is a catalyst of the polycondensation reactions. The polycondensation catalysts are familiar to a person skilled in the art. Without wishing to be limited, the catalyst C' could be selected from, among others, the compounds based on tin or titanium familiar to a person skilled in the art or from the organic catalysts such as the guanidines described in patent applications EP2268743 and EP2367867 or from the metal complexes for example based on Zn, Mo, Mg, etc., described in patent applications EP2222626, EP2222756, EP2222773, EP2935489, EP2935490 and WO2015/082837.

The crosslinkable silicone elastomer composition X may comprise between 0.1 and 2 wt % of catalyst C', relative to the total weight of the silicone composition X.

The crosslinking agent B' is preferably an organosilicon compound bearing, per molecule, more than two hydrolyzable groups bound to the silicon atoms. Crosslinking agents of this kind are familiar to a person skilled in the art and are commercially available.

The crosslinking agent B' is preferably a silicon compound, each molecule of which comprises at least three hydrolyzable, condensable groups selected from the group consisting of: alkoxy, alkoxy-alkylene-oxy, amino, amido, acylamino, aminoxy, iminoxy, ketiminoxy, acyloxy and enoxy, and preferably alkoxy. These groups are as defined above.

The crosslinkable silicone elastomer composition X may comprise between 1 and 20 wt % of crosslinking organosilicon compound B', preferably between 2 and 15%, relative to the total weight of the silicone composition X.

The filler E and the pigment G are as defined above.

According to one embodiment, the crosslinkable silicone elastomer composition X comprises between 10 and 40 wt % of filler E, preferably between 15 and 35%, relative to the total weight of the silicone composition X.

According to one embodiment, the crosslinkable silicone elastomer composition X comprises:

- between 40 and 90 wt %, preferably between 50 and 80 wt %, of at least one polyorganosiloxane A' crosslinkable by polycondensation;
- between 1 and 20 wt %, preferably between 2 and 15 wt %, of at least one crosslinking organosilicon compound B';
- between 0.1 and 2 wt % of at least one catalyst C';
- at least one heat-resistant additive D, which is cerium(IV) neodecanoate; and
- between 10 and 40 wt %, preferably between 15 and 35 wt %, of at least one filler E, said silicone composition X having a content of cerium(IV) between 50 and 3000 ppmw.

Silicone Elastomer

The invention also relates to a silicone elastomer obtained by crosslinking of composition X, at room temperature, optionally in the presence of moisture, or by heating. Heating is preferably carried out at a temperature between 80° C. and 250° C. The heating time varies depending on the temperature and, optionally, depending on the pressure applied. According to one embodiment, heating is carried out as follows:

- for some seconds to some minutes between 100 and 120° C., and
- for some seconds between 180 and 200° C.

The silicone composition X makes it possible to obtain an elastomer that is thermally stable after thermal treatment of 3 days at 300° C., 7 days at 275° C. or 21 days at 250° C. The elastomer obtained therefore has very good thermal stability, which allows it to be used for making the coverings or primary insulation of the single conductors included in the constitution of electric wires or cables.

The invention therefore also relates to an electric wire or electric cable comprising at least one conductive element 1 surrounded by at least one layer of primary insulation 2, characterized in that said layer of primary insulation 2 comprises a silicone elastomer obtained by crosslinking the silicone composition X.

The invention also relates to the use of a silicone composition X for making automobile cables, in particular automobile cables for electric or hybrid vehicles.

The invention also relates to the use of a silicone composition X for making the coverings or primary insulation of the single conductors included in the constitution of electric wires or cables.

The invention also relates to a method for making an electric wire or electric cable comprising the following steps:

i. forming, around an electrical conductor 1, at least one layer of primary insulation 2 that consists of a material obtained by crosslinking of the silicone composition X, preferably by heating to a temperature between 80° C. and 250° C., ii. optionally, assembling at least two insulated electrical conductors as obtained in step i, and iii. optionally, extruding an outer sheath as defined above around the insulated electrical conductor or conductors from step i or ii.

In the context of this method, formation of at least one layer of primary insulation 2 around the electrical conductor 1 may be carried out by depositing the silicone composition X around the electrical conductor 1 by the usual methods, in particular by extrusion methods. The deposit thus obtained is then crosslinked, preferably by heating, to lead to formation of the primary insulation of silicone elastomer. The heating time varies of course with the temperature of the material and the optional working pressure. It is generally of the order of a few seconds to several minutes between 100 and 120° C. and a few seconds between 180 and 200° C. It is possible to deposit several layers jointly using tandem extrusion equipped for example with a crosshead or by co-extrusion.

The electric wire or cable according to the invention may further comprise an outer sheath surrounding the insulated electrical conductor or conductors. This outer sheath is familiar to a person skilled in the art. It may burn completely locally and be transformed into residual ash under the effect of the high temperatures of a fire but without propagating the fire. The material making up the outer sheath may be for example a polyolefin-based polymer matrix and at least one hydrated fireproofing mineral filler selected in particular from the metallic hydroxides such as for example magnesium dihydroxide or aluminum trihydroxide. The outer sheath is obtained conventionally by extrusion.

According to a preferred embodiment, the electric wire or electric cable according to the invention is characterized in that the layer of primary insulation 2 is formed by depositing said silicone composition X around the conductive element 1 by an extrusion technique and by heating means so as to obtain a material temperature ranging from 80° C. to 250° C. until said silicone composition X is cured.

The following examples are given for purposes of illustration and they are not to be regarded as limiting the scope of the invention.

EXAMPLES

Heat-Resistant Additives

Cerium Neodecanoate

Cerium(IV) neodecanoate is synthesized according to the procedure described in EP0575189. Cerium(IV) neodecanoate is a liquid. It may be used pure (additive 1) or formulated (additives 2 and 3).

Additive 1: The proportion of cerium in additive 1 is 16.6 wt %.

Additive 2: cerium(IV) neodecanoate formulated in a kneader

In a kneader, 56.6 wt % of a poly(dimethyl) (methylvinyl) siloxane rubber, having 720 ppm of vinyl groups and a viscosity of 20 million mPa·s at 25° C., is mixed with 5.6 wt % of fumed silica treated with octamethylcyclotetrasiloxane, having a BET specific surface area of 235 $m^2/g$, and then 37.8 wt % of cerium(IV) neodecanoate is added. The mixture is mixed for 10 minutes at room temperature.

Additive 3: cerium(IV) neodecanoate formulated on rolls

In a device using 2 rolls, 56.6 wt % of a poly(dimethyl) (methylvinyl)siloxane rubber, having 720 ppm of vinyl groups and a viscosity of 20 million mPa·s at 25° C., is mixed with 5.6 wt % of fumed silica treated with octamethylcyclotetrasiloxane, having a BET specific surface area of 235 $m^2/g$, and then 37.8 wt % of cerium(IV) neodecanoate is added. The mixture is mixed for 10 minutes at room temperature.

The additives 2 and 3 have a proportion of cerium by weight of 0.063% relative to the total weight of the additive.

Additive 4

Additive 4 is an additive based on $TiO_2$ and $Fe_2O_3$ in a silicone rubber. The iron content is between 0.7 and 2.1 wt %. The $TiO_2$ content is greater than 94 wt %.

Additive 5

Additive 5 is cerium oxide purchased from Sigma Aldrich

Additive 6

Additive 6 is cerium(III) octoate purchased from Sigma Aldrich

Additive 7

Additive 7 is an antioxidant based on iron(III) ethyl-2-hexanoate in a silicone rubber. The iron content is 0.78 wt %.

Composition HCR 1

Base A

- 67.8 wt % of a mixture of vinylated polyorganosiloxanes, having a viscosity of 20 million mPa·s at 25° C. and a proportion of vinyl between 100 and 800 ppm,
- 1.8 wt % of a polydimethyl siloxane oil having 2 hydroxyl units, and
- 30.4 wt % of a fumed silica treated with octamethylcyclotetrasiloxane, having a BET specific surface area of 235 $m^2/g$.

Then 1.25% of 2,4-dichlorobenzoyl peroxide marketed under reference PERKADOX PD-50S-PS from Akzo Nobel, and a heat-resistant additive, are added to 100 parts of this base A.

Composition HCR 2

Base A

- 68.0% of a mixture of vinylated polyorganosiloxanes, having a viscosity of 20 million mPa·s at 25° C. and a proportion of vinyl between 100 and 800 ppm,
- 1.70 wt % of a polydimethyl siloxane oil having 2 hydroxyl units; and
- 30.30 wt % of a fumed silica treated with octamethylcyclotetrasiloxane, having a BET specific surface area of 235 $m^2/g$.

Then 1.25 wt % of 2.4-dichlorobenzoyl peroxide marketed under reference PERKADOX PD-50S-PS from Akzo Nobel, and a heat-resistant additive, are added to 100 parts of this base A.

Composition LSR

A mixer is charged with

- 29 parts of a dimethylpolysiloxane oil blocked at each end with $Me_2ViSiO_{1/2}$ units, having a viscosity of 60000 mPa·s,
- 29 parts of a dimethylpolysiloxane oil blocked at each end with $Me_2ViSiO_{1/2}$ units, having a viscosity of 100000 mPa·s,
- 26 parts of fumed silica having a BET specific surface area of 300 $m^2/g$ and 7 parts of hexamethyldisilazane.

The mixture is heated at 70° C. with stirring for 1 hour, then devolatilized, cooled and stored as Base 1. The following are then added to 45 parts of this Base 1, in a high-speed mixer:

- platinum is introduced in the form of organometallic complex at 10 wt % of platinum metal, known by the name Karstedt catalyst, diluted in a vinylated oil,
- 3 parts of a dimethylpolysiloxane oil having vinyl groups in the chain and at the chain end, and having a viscosity of 1000 mPa·s,
- 2 parts of a dimethylpolysiloxane oil having vinyl groups in the chain and at the chain end, and having a viscosity of 400 mPa·s.

Part A of this composition LSR is mixed for 1 minute at 1000 revolutions per minute in the high-speed mixer. The proportion of Pt is 10 ppm.

The following are then added to 45 parts of this Base 1, in a high-speed mixer:

- 1.3 parts of an organohydrogenopolysiloxane resin M'Q comprising Si—H groups,
- 0.5 parts of a linear organohydrogenopolysiloxane comprising Si—H groups in the chain and at the chain end and comprising about 20 wt % of Si—H groups,
- 1.5 parts of a dimethylpolysiloxane oil comprising vinyl groups in the chain and at the chain end, and having a viscosity of 400 mPa·s,
- 1.6 parts of a dimethylpolysiloxane oil having vinyl groups in the chain and at the chain end, and having a viscosity of 1000 mPa·s,
- 0.08 parts of ethynyl-1-cyclohexanol-1 as reaction inhibitor.

Part B of this composition LSR is mixed for 1 minute at 1000 revolutions per minute in the high-speed mixer. The same amount of heat-resistant additive is then added to parts A and B, using a high-speed mixer. Parts A and B are then mixed in a 1:1 ratio.

Mechanical Properties of the Elastomers Obtained After Crosslinking of the Silicone Compositions Test plates (150 mm×150 mm×2 mm) were made, in a four-cavity mold, under pressure for 8 minutes at 115° C.

After a postcure step of 4 h at 200° C. in a ventilated stove, the plates underwent thermal oxidation aging in ventilated stoves in different conditions of time and temperature, detailed in the examples given below.

The mechanical properties, in this case Hardness Shore A (ISO868, DIN53505), breaking strength (ISO37, DIN53504-51), elongation at break (ISO37, DIN53504-51), and resistance to tearing (ASTM D624 A), were measured on all of the plates aged in this way and were compared with the mechanical properties measured on the initial plates post-cured for 4 h at 200° C.

Various heat-resistant additives were tested. The results are presented in Table 1.

TABLE 1

| Composition HCR2 | Ex. 1 | Comp. Ex. 1 | Comp. Ex. 2 | Comp. Ex. 3 | Comp. Ex. 4 |
|---|---|---|---|---|---|
| Additive | Additive 2 Ce 220 ppm | Additive 4 $TiO_2$ | Additive 5 Ce 220 ppm | Additive 6 Ce 220 ppm | Additive 7 Fe (III) 34 ppm |
| Mechanical properties - Postcure 4 h at 200° C. - R | | | | | |
| Hardness Shore A - HSA (pt) | 59 | 58 | 57 | 58 | 56 |
| Breaking strength - BS (MPa) | 10.6 | 10.9 | 9.5 | 10.0 | 10.3 |
| Elongation at break - EB (%) | 505 | 522 | 426 | 447 | 540 |
| Modulus 100% (MPa) | 1.5 | 1.5 | 1.6 | 1.6 | 1.4 |
| Modulus 200% (MPa) | 2.8 | 2.9 | 3.5 | 3.6 | 2.4 |
| Modulus 300% (MPa) | 4.9 | 4.8 | 6.0 | 6.1 | 4.2 |
| Appearance | Transparent | Opaque | Opaque | Opaque | Opaque |

TABLE 1-continued

| Composition HCR2 | Ex. 1 | Comp. Ex. 1 | Comp. Ex. 2 | Comp. Ex. 3 | Comp. Ex. 4 |
|---|---|---|---|---|---|
| | | Thermal aging 7 d at 275° C. | | | |
| Hardness Shore A - HSA (pt) | 65 | 64 | Brittle | Brittle | Brittle |
| Breaking strength - BS (MPa) | 8.1 | 7.0 | | | |
| Elongation at break - EB (%) | 292 | 342 | | | |
| Modulus 100% (MPa) | 2.8 | 2.4 | | | |

These results show that cerium(IV) neodecanoate (example 1) makes it possible to obtain good mechanical properties and better thermal stability than cerium oxide (additive 5), cerium(III) octoate (additive 6) and iron(III) ethyl-2-hexanoate (additive 7) (Comp. Ex. 2-4). Moreover, the mechanical properties obtained with cerium(IV) neodecanoate are comparable to those obtained for $TiO_2$ (additive 4, Comp. Ex. 1). However, with cerium(IV) neodecanoate, the plate obtained is transparent, in contrast to the plate obtained with $TiO_2$ (additive 4, Comp. Ex. 1).

The compositions according to the invention therefore make it possible to obtain a transparent silicone elastomer having good mechanical properties and good thermal stability.

Various concentrations of cerium(IV) neodecanoate were tested. The results are presented in Table 2.

TABLE 2

| Composition HCR2 | Ex. 2 | Ex. 3 | Ex. 1 | Ex. 4 | Ex. 5 | Ex. 6 |
|---|---|---|---|---|---|---|
| Additive | Additive 2 0.15% Ce (IV) 90 ppm | Additive 2 0.25% Ce (IV) 160 ppm | Additive 2 0.35% Ce (IV) 220 ppm | Additive 2 0.41% Ce (IV) 260 ppm | Additive 2 1.61% Ce (IV) 1010 ppm | Additive 2 3.29% Ce (IV) 2600 ppm |
| | | | Mechanical properties - Postcure 4 h at 200° C. - R | | | |
| Hardness Shore A - HSA (pt) | 59 | 59 | 59 | 58 | 55 | 55 |
| Breaking strength - BS (MPa) | 11.3 | 11.0 | 10.6 | 10.8 | 11.0 | 10.7 |
| Elongation at break - EB (%) | 514 | 517 | 505 | 516 | 586 | 644 |
| Modulus 100% (MPa) | 1.5 | 1.4 | 1.5 | 1.5 | 1.3 | 1.2 |
| Modulus 200% (MPa) | 3.0 | 2.8 | 2.8 | 2.9 | 2.5 | 2.1 |
| Modulus 300% (MPa) | 5.2 | 4.8 | 4.9 | 4.9 | 4.1 | 3.5 |
| Appearance | Transparent | Transparent | Transparent | Transparent | Transparent | Transparent |
| | | | Thermal aging 7 d at 275° C. | | | |
| Hardness Shore A - HSA (pt) | 67 | 66 | 65 | 66 | 75 | 81 |
| Breaking strength - BS (MPa) | 8.6 | 7.9 | 8.1 | 8.1 | 7.7 | 8.0 |
| Elongation at break - EB (%) | 311 | 278 | 292 | 300 | 156 | 108 |
| Modulus 100% (MPa) | 2.9 | 3.0 | 2.8 | 2.7 | 4.9 | 7.3 |
| | | | Thermal aging 3 d at 300° C. | | | |
| Hardness Shore A - HSA (pt) | 71 | 72 | 71 | 70 | 79 | 80 |
| Breaking strength - BS (MPa) | 7.2 | 7.2 | 7.7 | 7.5 | 8.5 | 7.5 |
| Elongation at break - EB (%) | 225 | 228 | 238 | 223 | 150 | 108 |
| Modulus 100% (MPa) | 3.4 | 3.3 | 3.3 | 3.5 | 5.8 | 6.2 |

These results show that good mechanical properties and good thermal stability are obtained over a wide range of concentration of cerium(IV) neodecanoate.

Cerium(IV) neodecanoate, pure and formulated, was tested. The results are presented in Table 3.

TABLE 3

| Composition HCR 1 | Ex. 7 | Ex. 8 | Ex. 9 |
|---|---|---|---|
| Additive | Additive 1 Ce (IV) 257 ppm | Additive 2 Ce (IV) 257 ppm | Additive 3 Ce (IV) 257 ppm |
| Mechanical properties - Postcure 4 h at 200° C. - R | | | |
| Hardness Shore A - HSA (pt) | 63 | 63 | 62 |
| Breaking strength - BS (MPa) | 9.9 | 10.6 | 9.7 |
| Elongation at break - EB (%) | 353 | 372 | 360 |
| Modulus 100% (MPa) | 2.3 | 2.3 | 2.1 |
| Modulus 200% (MPa) | 4.7 | 4.6 | 4.4 |
| Modulus 300% (MPa) | 7.9 | 7.9 | 7.6 |
| Resistance to tearing - RD (KN/m) | 25 | 24 | 25 |
| Appearance | Transparent | Transparent | Transparent |

TABLE 3-continued

| Composition HCR 1 | Ex. 7 | Ex. 8 | Ex. 9 |
|---|---|---|---|
| Thermal aging 7 d at 275° C. | | | |
| Hardness Shore A - HSA (pt) | 73 | 72 | 71 |
| Breaking strength - BS (MPa) | 6.5 | 7.0 | 7.0 |
| Elongation at break - EB (%) | 205 | 213 | 234 |
| Modulus 100% (MPa) | 3.5 | 3.7 | 3.2 |
| Modulus 200% (MPa) | 5.8 | 6.1 | 6.0 |
| Thermal aging 21 d at 250° C. | | | |
| Hardness Shore A - HSA (pt) | 69 | 71 | 70 |
| Breaking strength - BS (MPa) | 6.4 | 7.3 | 7.1 |
| Elongation at break - EB (%) | 185 | 188 | 185 |
| Modulus 100% (MPa) | 3.7 | 4.1 | 4.0 |

The results show that it is possible to use pure or formulated cerium(IV) neodecanoate, as the results obtained are comparable.

These results also show that the elastomer obtained retains its good mechanical properties, and in particular elastomeric properties, even after thermal aging for 21 days at 250° C.

Cerium(IV) neodecanoate was also tested in a composition LSR. The results are presented in Table 4.

TABLE 4

| | Comp. Ex. 5 | Ex. 10 | Ex. 11 | Ex. 12 | Comp. Ex. 6 |
|---|---|---|---|---|---|
| LSR Part A | 50.0 | 50.0 | 50.0 | 50.0 | 50.0 |
| LSR Part B | 50.0 | 50.0 | 50.0 | 50.0 | 50.0 |
| Additive 1 | 0.000 | 0.060 | 0.090 | 0.120 | |
| Additive 7 | | | | | 0.060 |
| Ce (IV) in LSR in ppm | 0 | 100 | 149 | 199 | |
| Fe (III) in LSR in ppm | 0 | 0 | 0 | 0 | 34 |
| Crosslinking kinetics - 6 min, 170° C. (initial) | | | | | |
| Ts2 (s) | 10.8 | 10.8 | 10.8 | 12.6 | 10.8 |
| T50 (s) | 13.4 | 13.6 | 13.5 | 15.2 | 13.7 |
| T90 (s) | 17.6 | 17.9 | 19.0 | 19.5 | 18.3 |
| S'min (dNm) | 0.02 | 0.02 | 0.02 | 0.02 | 0.01 |
| S'max (dNm) | 12.8 | 11.7 | 12.1 | 10.5 | 12.0 |
| v max (dNm/min) | 98.9 | 93.4 | 91.2 | 82.5 | 93.5 |
| Mechanical properties - Postcure 4 h at 200° C. - R | | | | | |
| Hardness Shore A - HSA (pt) | 56 | 54 | 54 | 52 | 55 |
| Breaking strength - BS (MPa) | 8.3 | 8.6 | 8.4 | 8.9 | 8.8 |
| Elongation at break - EB (%) | 501 | 581 | 586 | 640 | 577 |
| Modulus 100% (MPa) | 2.5 | 2.3 | 2.2 | 2.4 | 2.4 |
| Modulus 200% (MPa) | 4.0 | 3.5 | 3.4 | 3.3 | 3.6 |
| Modulus 300% (MPa) | 5.3 | 4.7 | 4.5 | 4.4 | 4.9 |

TABLE 4-continued

| | Comp. Ex. 5 | Ex. 10 | Ex. 11 | Ex. 12 | Comp. Ex. 6 |
|---|---|---|---|---|---|
| Resistance to tearing - RD (kN/m) | 50 | 51 | 49 | 50 | 50 |
| Appearance | Transparent | Transparent | Transparent | Transparent | Opaque |
| Aging 3 days at 250° C. | | | | | |
| HSA (pt) | 69 | 56 | 54 | 51 | 67 |
| BS (MPa) | 2.0 | 5.7 | 5.5 | 4.6 | 3.2 |
| EB (%) | 42 | 223 | 233 | 221 | 72 |
| Modulus 100% (MPa) | 0.0 | 2.8 | 2.7 | 2.5 | 0.0 |
| Modulus 200% (MPa) | 0.0 | 5.2 | 4.9 | 4.2 | 0.0 |
| RD (kN/m) | 4 | 15 | 15 | 12 | 6 |
| Aging 3 days at 275° C. | | | | | |
| HSA (pt) | 60 | 53 | 53 | 52 | 63 |
| BS (MPa) | 2.2 | 5.0 | 5.0 | 4.9 | 2.4 |
| EB (%) | 56 | 209 | 230 | 209 | 52 |
| Modulus 100% (MPa) | 0.0 | 2.6 | 2.5 | 2.6 | 0.0 |
| Modulus 200% (MPa) | 0.0 | 4.6 | 4.5 | 4.5 | 0.0 |
| RD (kN/m) | 7 | 19 | 18 | 13 | 7 |

These results show that it is also possible to increase the thermal stability of the compositions LSR, crosslinkable by polyaddition, using cerium(IV) neodecanoate. Moreover, the mechanical properties obtained with cerium(IV) neodecanoate are good. In fact, after 3 days of aging at 250° C. or at 275° C., the elongation at break is greater in the case of cerium(IV) neodecanoate (examples 10-12) than without heat-resistant additive or with iron(III) ethyl-2-hexanoate (additive 7) (Comp. Ex. 5-6). Tests have also shown that above 300 ppm, the crosslinking kinetics is impacted for the compositions LSR, and the crosslinking rate goes down.

Cerium(IV) neodecanoate was also tested in conditions in which automobile cables are tested. The results are presented in Table 5.

TABLE 5

| Composition HCR 1 | Ex. 13 |
|---|---|
| Additive | Additive 1 0.4 wt % |
| Mechanical properties - Postcure 8 min at 115° C. | |
| Hardness Shore A - HSA (pt) | 62 |
| Breaking strength - BS (MPa] | 10.6 |
| Elongation at break - EB (%) | 360 |
| Modulus 100% (MPa) | 2.3 |
| Resistance to tearing - RD (kN/m] | 20 |
| Appearance | Transparent |
| Aging 3000 hours at 200° C. | |
| Hardness Shore A - HSA (pt) | 73 |
| Breaking strength - BS (MPa] | 8.0 |
| Elongation at break - EB (%) | 240 |
| Modulus 100% (MPa) | 3.5 |
| Resistance to tearing - RD (kN/m) | 15 |

These results show that the elastomer obtained retains its good mechanical properties, and in particular elastomeric properties, even after thermal aging of 3000 hours at 200° C., which corresponds to the standards according to which automobile cables are tested (cf. ISO 6722-1).

The invention claimed is:

1. A crosslinkable silicone elastomer composition X comprising:

at least one heat-resistant additive D, which is cerium(IV) neodecanoate, the silicone composition X having a content of cerium(IV) of from about 50 ppm and about 3000 ppm wherein the composition further comprises: at least one polyorganosiloxane A comprising, per molecule, at least 2 alkenyl groups having form 2 to 6 carbon atoms; optionally, at least one polyorganosiloxane B comprising, per molecule, at least 2 hydrogensilyl functions Si—H; at least one crosslinking catalyst C; and at least one filler E.

2. The composition as claimed in claim 1, wherein the composition it has a content of cerium(IV) of from about 50 ppm to about 350 ppm.

3. The composition as claimed in claim 1, wherein the composition it comprises from about 15 wt % to about 35 wt % of filler E.

4. The composition as claimed in claim 1, wherein the crosslinking catalyst C is an organic peroxide.

5. The composition as claimed in claim 1, wherein the composition it comprises at least one polyorganosiloxane B comprising, per molecule, at least 2 hydrogenosilyl functions Si—H, and in that the crosslinking catalyst C is a polyaddition catalyst.

6. A silicone elastomer obtained by crosslinking of the crosslinkable silicone elastomer composition X as claimed in claim 1.

7. An electric wire or electric cable comprising at least one conductive element 1 surrounded by at least one layer of primary insulation 2, wherein the layer of primary insulation 2 comprises a silicone elastomer as claimed in claim 6.

8. A method of making a covering or primary insulation of single conductors included in the constitution of an electric wire or cable, the method comprising incorporating the crosslinkable silicone elastomer composition X as claimed in claim 1 in the covering or primary insulation of the single conductors.

9. A method of making an automobile cable, the method comprising making the cable with a crosslinkable silicone elastomer composition X as claimed in claim 1.

10. The method of making an electric wire or electric cable as claimed in claim 7, wherein the method comprises the following steps:

i. forming, around an electrical conductor 1, at least one layer of primary insulation 2 that comprises of a material obtained by crosslinking the crosslinkable silicone elastomer composition X as claimed in claim 1, ii. optionally, assembling at least two insulated electrical conductors as obtained in step i, and iii. optionally, extruding an outer sheath as defined above around the insulated electrical conductor or conductors from step i or ii.

11. The composition as claimed in claim 2, wherein the content of the cerium(IV) is from about 60 ppm to about 300 ppm.

12. The composition as claimed in claim 2, wherein the content of the cerium(IV) is from about 70 ppm to about 250 ppm.

13. The composition as claimed in claim 2, wherein the content of the cerium(IV) is from about 90 ppm to about 200 ppm.

14. The composition as claimed in claim 3, wherein the filler E is silica.

15. The silicone elastomer of claim 6, wherein the crosslinking is conducted by heating to a temperature of from about 80° C. to about 250° C.

16. The method of claim 9, wherein the automotive cable is a cable for electric or hybrid vehicles.

17. The method of claim 10, wherein the crosslinking is conducted by heating to a temperature of from about 80° C. to about 250° C.

* * * * *